Nov. 8, 1966   W. FISHER   3,283,536
FLEXIBLE MECHANICAL COUPLING
Filed Oct. 6, 1964   3 Sheets-Sheet 1
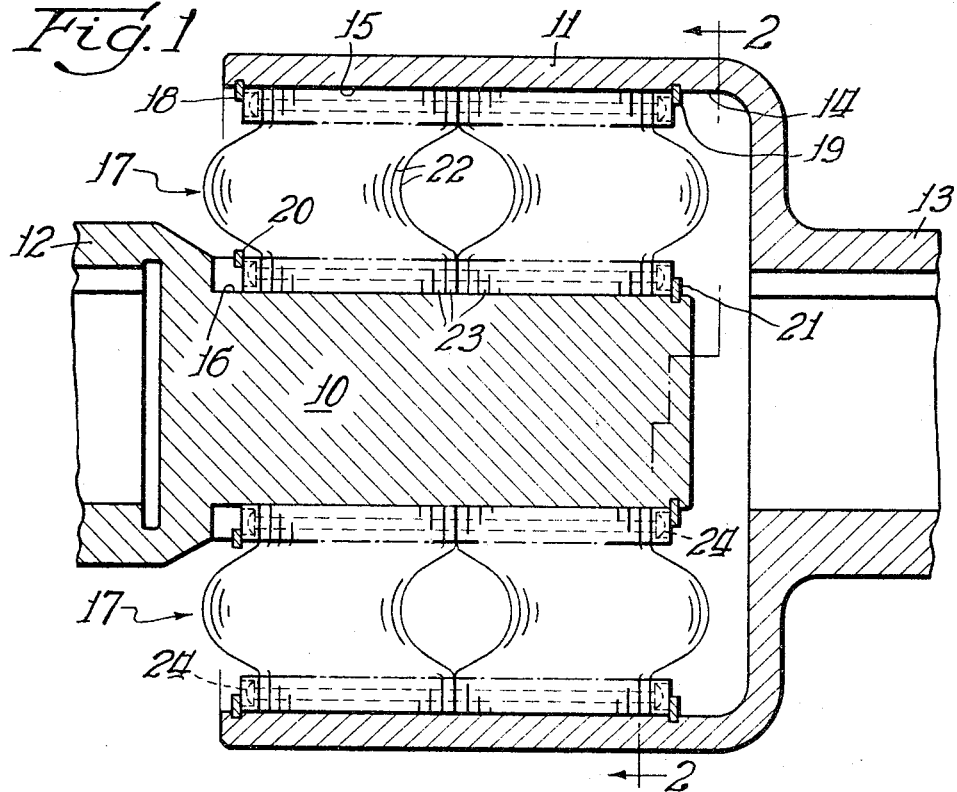
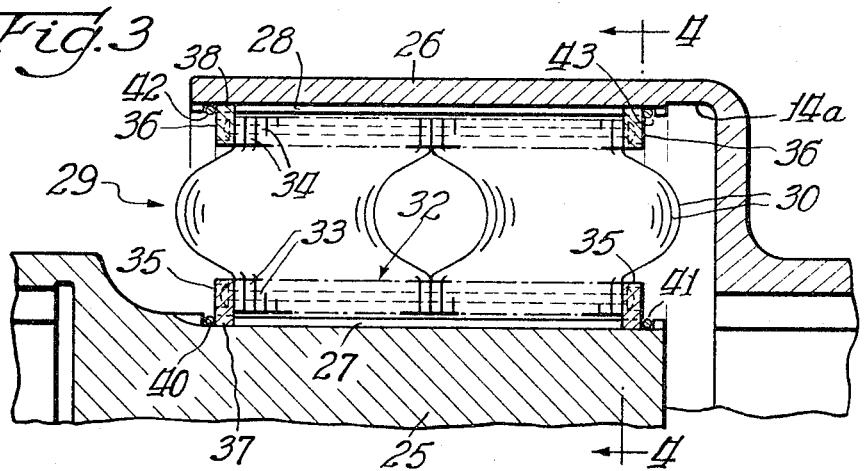
Inventor:
Walter Fisher

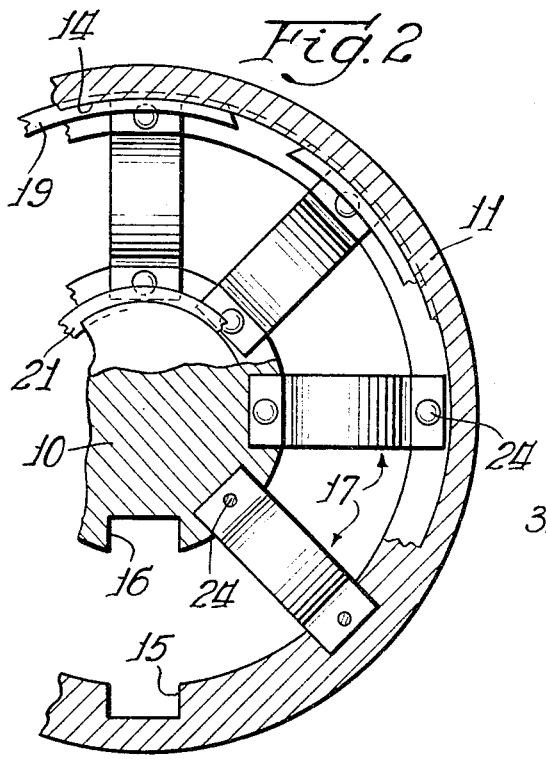
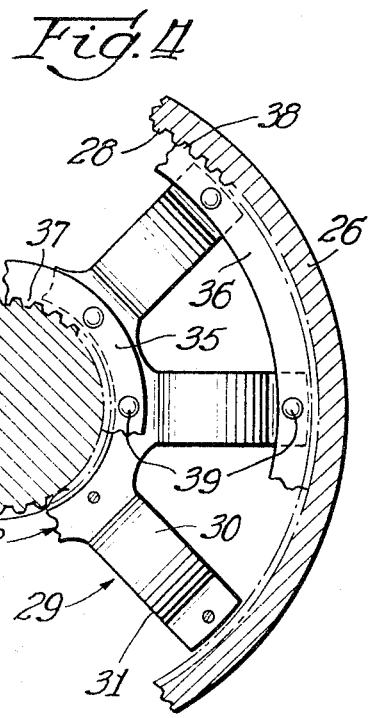
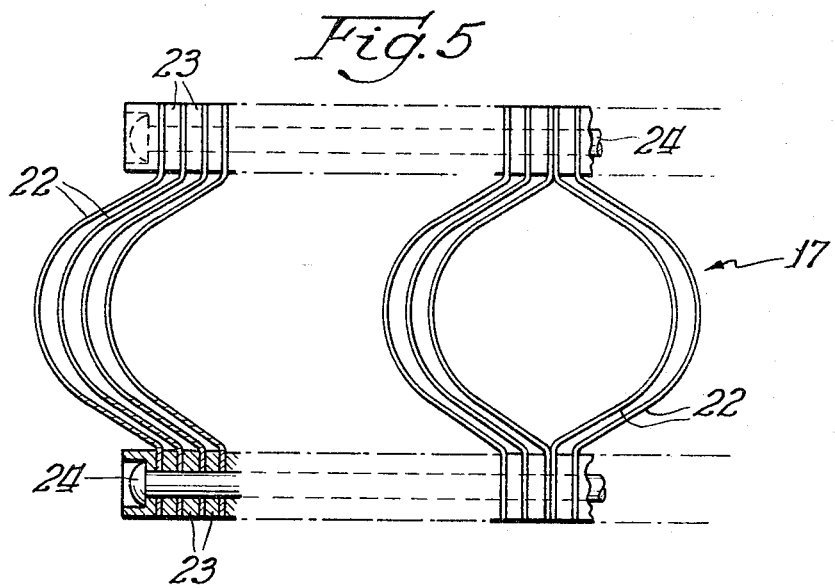

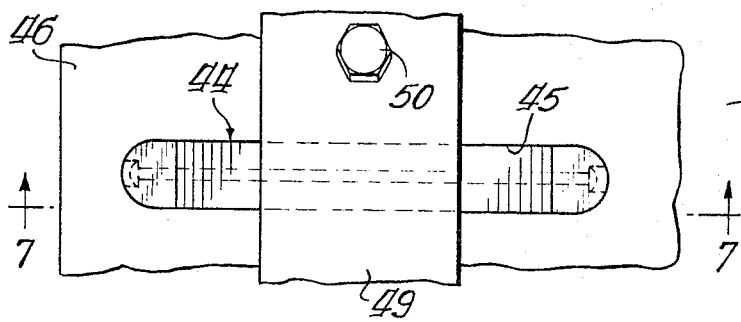
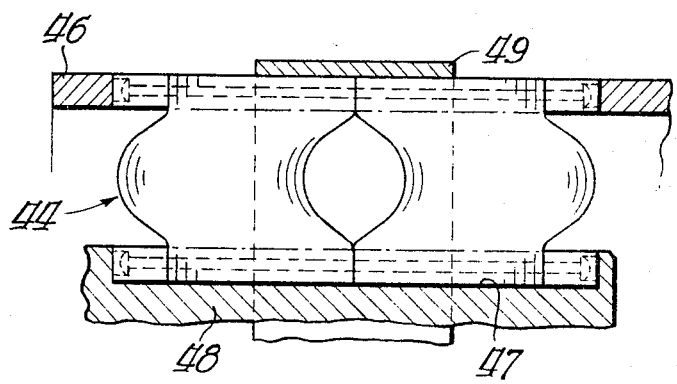
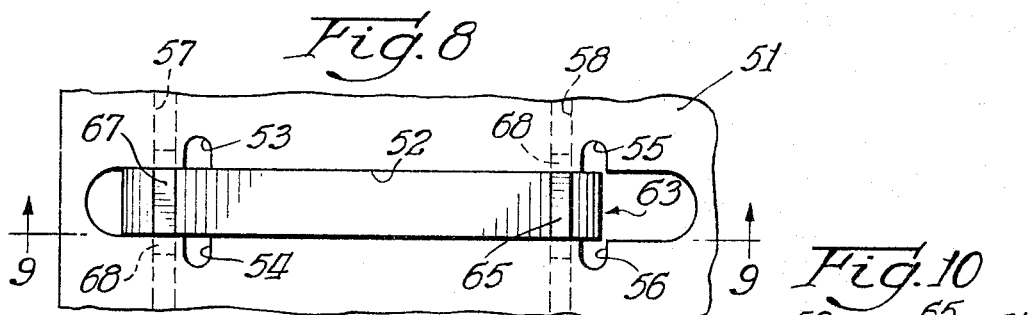
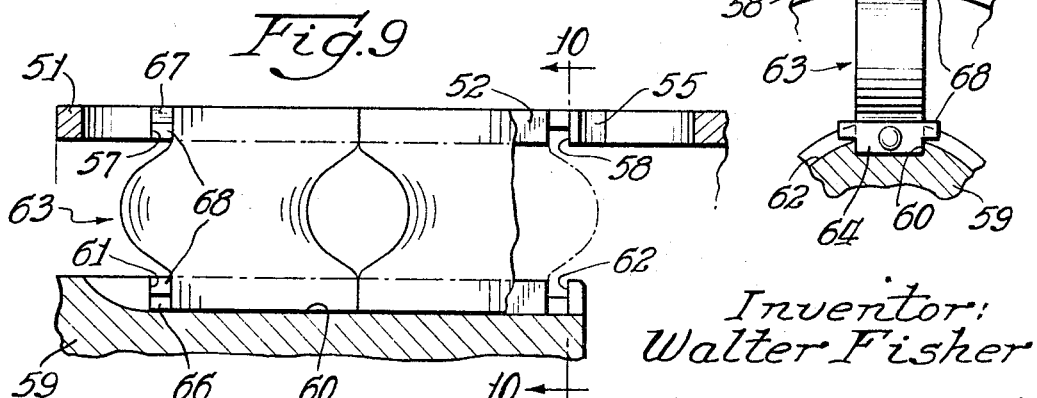

United States Patent Office 3,283,536
Patented Nov. 8, 1966

3,283,536
FLEXIBLE MECHANICAL COUPLING
Walter Fisher, Mount Prospect, Ill., assignor to Borg-Warner Corporation, Chicago, Ill., a corporation of Illinois
Filed Oct. 6, 1964, Ser. No. 401,928
6 Claims. (Cl. 64—15)

The present invention relates to a flexible coupling and more particularly to a coupling which is substantially rigid in the plane of rotation but flexible in all other directions.

The flexible coupling of the present invention comprises a series of leaf springs as individual leafs or stacked leafs which are oriented in an axial plane and connected at their respective terminals, which may be designated as inner and outer terminals, to the inner surface of a relatively large rotating member and to the outer surface of a relatively small rotating member.

The flexible coupling according to the present invention is practical in a variety of applications. It may be used in place of a coupling commonly known as a universal joint, and where axial movement between the shafts connected is adherent to its application, the leaf spring elements are constructed and arranged to permit this axial movement and therefore its application as a flexible coupling in an automotive drive line or similar application obviates the need for the normally used spline arrangement.

It is therefore an important object of the present invention to provide an improved flexible coupling which is flexible in all directions except in the direction of rotation.

It is another important object of the present invention to provide an improved flexible coupling which comprises leaf springs interconnecting the rotating elements which provides axial movement of the connected rotating elements.

The present invention consists of the novel constructions, arrangements and devices to be hereinafter described and claimed for carrying out the above stated objects and such other objects as will be apparent from the following descriptions of preferred forms of the invention, illustrated with reference to the accompanying drawings, wherein:

FIGURE 1 is a longitudinal cross section view of a flexible coupling according to the present invention;

FIGURE 2 is a cross section taken on line 2—2 of FIGURE 1;

FIGURE 3 is a modified form, in fragment, of the present invention, similar to that shown in FIGURE 1, differing primarily in the means of anchoring the leaf spring elements;

FIGURE 4 is a fragmentary cross section view taken on line 4—4 of FIGURE 3;

FIGURE 5 is an enlarged fragmentary view of the leaf spring elements of FIGURE 1;

FIGURE 6 is a fragmentary view of another form of a flexible coupling according to the present invention showing a slot through the outer perimeter of the housing of the outer shaft, including an annular band in fragment;

FIGURE 7 is a fragmentary longitudinal cross section viewed in the direction shown by arrows 7—7, FIGURE 6;

FIGURE 8 is a fragmentary view of another form of a flexible coupling according to the present invention showing a slot with lateral extensions through the outer perimeter of the housing of the outer shaft;

FIGURE 9 is a fragmentary longitudinal cross section view of a flexible coupling according to the present invention as viewed in the direction shown by arrows 9—9, FIGURE 8; and FIGURE 10 is a fragmentary view taken on lines 10—10, FIGURE 9.

An embodiment of the present invention, FIGURE 1, shows a shaft 10 and an anular shell 11 provided with hubs 12 and 13, respectively. The shaft 10 is disposed concentrically within the annular shell 11. The inner periphery 14 of the annular shell 11 and the outer periphery of the shaft 10 are provided with slots 15 and 16, respectively. Spring packs 17 are mounted at opposite ends thereof in the respective slots 15 and 16 and retained axially by snap rings 18, 19, 20 and 21.

The spring packs 17 comprise a multiplicity of closely stacked, comparatively thin leaf springs 22 provided with spacers 23 therebetween to thereby prevent rubbing contact between the thin leaf springs 22 which are held together by rivets 24. The leaf springs 22 are oriented in an axial plane and bowed axially with respect to rotation.

Another embodiment of the present invention, FIGURE 3, is similar to that shown in FIGURE 1 except as to the mounting and the construction of the spring packs. The shaft 25 and the annular shell 26, respectively, are provided with splines 27 and 28 which carry a unitary spring pack 29 that comprises a multiplicity of formed spring blanks 30 having bowed leaf spring members 31 extending radially from a hub 32 provided with an opening 32a therethrough. Inner and outer spacer rings 33 and 34 are assembled between the formed spring blanks 30 at their inner peripheries and outer peripheries, respectively. A pair of inner and outer anchor rings 35 and 36, respectively, having splines 37 and 38, respectively, at their inner and outer peripheries, respectively, which match the splines 27 and 28, respectively, are assembled on opposite sides of the assembled spring blanks 30 with their spacer rings 33 and 34 therebetween and fastened to these assembled components by rivets 39 thus providing a number of connected spring packs as a unitary structure.

The unitary spring pack 29, by means of opening 32a, is assembled over the shaft 25 within the inner periphery 14a of the annular shell 26. The leaf spring members 31, which are bowed axially and held under compression, when thus assembled, are secured against movement at their respective terminals against relative movement in the direction of rotation by the engagement of the splines 37 and 38 with the splines 27 and 28, respectively.

The unitary spring pack 29 is held against axial movement by a pair of inner snap rings 40 mounted in a pair of matching annular grooves 41 in the outer perimeter of the shaft 25, and by a pair of outer snap rings 42 mounted in a pair of matching annular grooves 43 in the inner periphery 14a of the annular shell 26.

In another embodiment of the present invention, FIGURES 6 and 7, spring packs 44, similar to spring packs 17, are inserted through slots 45 in the perimeter of an annular shell 46 similar to annular shell 11, and set into slots 47 in the outer perimeter of a shaft 48 which is similar to shaft 10. The spring packs 44 are retained in position by a band 49, as shown in the drawings, which is fastened by a stud 50.

FIGURES 8 and 9 show a modification of the embodiment of the present invention shown in FIGURES 6 and 7. An annular shell 51 is provided with slots 52 which have lateral extensions 53 and 54 at one end thereof and lateral extensions 55 and 56 at the other ends thereof. Annular grooves 57 and 58 are provided within the inner periphery of the annular shell 51, adjacent to the lateral extensions 53 and 54, and the lateral extensions 55 and 56, respectively, and spaced therefrom in the same direction.

A shaft 59 is provided with slots 60 complimentary with respect to the slots 52. The slots 60 are intersected by annular grooves 61 and 62 in the outer perimeter of the shaft 59, which are in alignment with the annular grooves 57 and 58, respectively.

Spring packs 63, similar to spring packs 44, are provided with inner and outer end retainers 64 and 65, respectively, at one end thereof and inner and outer end retainers 66 and 67 at the other end thereof, respectively.

The end retainers are provided with end retainer projections 68 as shown in the drawings.

The spring packs 63 are assembled radially through the slots 52; the inner ends being inserted in corresponding slots 60 in the shaft 59. The spring packs are then moved laterally in a direction so that the end retainer projections 68 of the inner end retainers 64 and 66 engage the annular grooves 62 and 61, respectively, and end retainer projections 68 of the outer end retainers 65 and 67 engage the annular grooves 58 and 57, respectively, thereby locking the spring packs 63 against axial movement and also, obviously, against radial movement; the spring packs 63 being under compression when thus assembled radially around the shaft 59 and within the inner perimeter of the annular shell 51.

In operation it is apparent when rotative movement is applied to the flexible mechanical couplings, according to the present invention, axial movement between the shaft 10 and the annular shell 11 is inherent in the structure and also that angularity between the shaft 10 and the annular shell 11 is provided for. It is also apparent that there is no relative movement in the plane of rotation between the shaft 10 and the annular shell 11 because the leaf spring elements are oriented in the plane of rotation. The foregoing is also true with respect to the other embodiments of the present invention.

While this invention has been described in connection with certain specific embodiments thereof, it is to be understood that is by way of illustration and not by way of limitation and the scope of this invention is defined solely by the appended claims which should be construed as broadly as the prior art will permit.

I claim:
1. In a flexible mechanical coupling comprising:
 (a) an annular shell having first splines in its inner periphery,
 (b) a shaft within said annular shell in concentric alignment therewith and provided with second splines in its outer periphery complimenting the said first splines,
 (c) a unitary spring pack comprising a multiplicity of bowed leaf spring elements having a hub provided with an opening therethrough and having third splines in the inner periphery of said hub matching the said second splines and fourth splines on the outer periphery of said unitary spring pack matching the said first splines, the said unitary spring pack being assembled over the said shaft by means of an opening through said hub within the inner periphery of said annular shell, the said third splines engaging the said second splines and the said fourth splines engaging the said first splines, and
 (d) means for retaining the outer periphery of said unitary spring pack and the said hub against axial movement.

2. In a flexible mechanical coupling according to claim 1 wherein the said unitary spring pack comprises a multiplicity of formed spring blanks having radially extending bowed leaf spring members, the said spring blanks being stacked together with spacer rings therebetween and fastened together by conventional means such as rivets.

3. In a flexible mechanical coupling the combination of:
 (a) spring packs, each comprising a multiplicity of stacked bowed leaf springs fastened together at their terminals by suitable means such as rivets,
 (b) an annular shell having first axially extending slots therethrough,
 (c) a shaft concentrically aligned within said annular shell having second axially extending slots therein complimenting the said first slots, said spring packs being arranged radially between said shaft and said annular shell, the inner terminals thereof being in engagement with the respective second slots and the outer terminals being in engagement with the respective said first slots, and
 (d) a band encompassing the said shell over the said first slots thereby anchoring the said spring pack between the said shaft and the said annular shell, the said first slots serving as a means through which the spring packs may be passed in the process of assembly.

4. A flexible mechanical coupling according to claim 3 wherein the said multiplicity of bowed leaf springs are under compression.

5. In a flexible mechanical coupling according to claim 3 wherein the said multiplicity of bowed leaf springs are under compression.

6. In a flexible mechanical coupling the combination of:
 (a) spring packs, each comprising:
  (1) a multiplicity of stacked bowed leaf springs fastened together at opposite terminals thereof by suitable means such as rivets,
  (2) first end retainer projections at both ends of the outer terminals of said spring packs, and
  (3) second end retainer projections at both ends of the inner terminals of the said spring packs,
 (b) a shaft provided with first axially extending slots and a first pair of annular grooves, one each, intersecting opposite ends of said first slots, and
 (c) an annular shell provided with second axially extending slots therethrough and a second pair of annular grooves, one each, intersecting opposite ends of said second slots, said spring packs being arranged radially between said shaft and said annular shell and locked in position by the seating of the inner terminals of said spring pack in the respective first slots; by the seating of the said second retainer projections in the respective said second annular grooves, by the seating of the outer terminals of said spring pack in the respective second slots, and by the seating of the said first retainer projections in the respective said second annular grooves, the said second slots also serving as a means for assembling the said spring packs between the said shaft and the said annular shell.

References Cited by the Examiner
UNITED STATES PATENTS

| | | | |
|---|---|---|---|
| 1,404,659 | 1/1922 | Serrell et al. | 64—15 |
| 1,642,602 | 9/1927 | Constantinesco | 64—15 X |
| 1,764,348 | 6/1930 | Rampacher | 64—15 |
| 3,183,731 | 5/1965 | Dolza | 64—15 |

FOREIGN PATENTS

| | | |
|---|---|---|
| 446,977 | 12/1912 | France. |

FRED C. MATTERN, Jr., *Primary Examiner.*

HALL C. COE, *Examiner.*